United States Patent [19]

Thorn et al.

[11] Patent Number: 4,853,955
[45] Date of Patent: Aug. 1, 1989

[54] APPARATUS AND METHOD FOR PROVIDING EXISTING TELEPHONE SWITCHING EQUIPMENT WITH THE CAPABILITY OF USING THE SS7 PROTOCOL

[75] Inventors: David W. Thorn, Richardson; Rajendra Patel, Plano; Gerald Coley, Terrell; Ashok Trivedi; Girish Patel, both of Plano, all of Tex.

[73] Assignee: Network Access Corporation, Richardson, Tex.

[21] Appl. No.: 186,610

[22] Filed: Apr. 27, 1988

[51] Int. Cl.[4] ........................ H04M 7/06; H04M 7/12
[52] U.S. Cl. .................................... 379/230; 379/142; 379/240; 379/289
[58] Field of Search ............... 379/230, 240, 229, 284, 379/269, 289, 142

[56] References Cited

U.S. PATENT DOCUMENTS

| | | | |
|---|---|---|---|
| 4,247,740 | 1/1981 | Anderson et al. | 379/124 |
| 4,499,336 | 2/1985 | Krikor et al. | 379/230 |
| 4,636,584 | 1/1987 | Binkerd et al. | 379/240 |
| 4,685,127 | 8/1987 | Miller et al. | 379/221 |

OTHER PUBLICATIONS

"CCITT Signalling System No. 7 in AXE 10", Jan Du Reitz et al., *Ericsson Review* (Sweden), No. 2, 1982, pp. 100-105.

"Gazing into the SPC Network Future Reveals Vista of New-Features", T. H. Gordon et al., *Telephony*, Feb. 21, 1983, pp. 86, 88, 93.

*Primary Examiner*—Thomas W. Brown
*Attorney, Agent, or Firm*—Harold E. Meier

[57] ABSTRACT

The invention relates to upgrading existing telephone central offices which utilize electromechanical or electronic switching equipment incapable of using the SS7 protocol. In particular, it relates to providing the switching equipment with the capability of controlling the connection, management, and disconnection of telephone circuits using Signaling System Number 7, a national and international standard set of protocols for providing such circuit control and providing and receiving information via the SS7 protocol for enabling enhanced service in the switching equipment.

31 Claims, 2 Drawing Sheets

APPARATUS AND METHOD FOR PROVIDING EXISTING TELEPHONE SWITCHING EQUIPMENT WITH THE CAPABILITY OF USING THE SS7 PROTOCOL

BACKGROUND OF THE INVENTION

1. Field of the Invention

The invention relates to telephone switching offices which utilize electromechanical or electronic switching equipment. In particular, the invention relates to a method and apparatus for providing the switching equipment with the capability of controlling the connection, management and disconnection of telephone circuits using Signaling System #7, (SS7 ), a national and international standard set of protocols for providing such circuits control, and providing and receiving information via the SS7 protocol for enabling enhanced services in the switching equipment.

2. Description of the Prior Art

The existing telephone network in the United States of America is largely a remnant of the earlier AT & T Network which was divested into several regional holding companies pursuant to an order of a Federal Court. This existing network had been designed to provide the equivalent of an electrical connection between two points in the network. The only information originating within the telephone network, and the conveyance of this information, was related to the provision of a basic capability to connect the two points.

Advances in the state of the art of communications have lead to the possibility of providing the existing services of the telephone network in a more efficient manner while simultaneously establishing the foundation for new network services beyond the capability of the existing network. The realization of this possibility has resulted in both national and international development of new standards for communication protocols between the switching elements within the telephone network. These new standards are widely referred to as "Signaling System #7 (SS7 )". For example, see TR-NPL-000246 "Bell Communications Research Specification of Signaling System No. 7, Revision #2, 6/87."

Until now, the provision of SS7 capability within electromechanical switching systems has not been accomplished and thus, with the current art, would require the replacement of the switch with a newer version. The difficulty of accomplishing the conversion of such electromechanical and electronic switches is demonstrated by the inability of the trunk circuit interfaces on these switches to support the out-of-band signaling method employed by SS7 and by the lack of the capability for processing the SS7 protocol messages used to implement the services.

As the majority of telephones in the United States of America are connected to crossbar offices, 1ESS (a Trademark of AT&T Technologies, Inc.) or 1AESS (a Trademark of AT&T Technologies, Inc.) switches, the replacement or upgrading of these switches would require vast economic expenditures by the telephone companies. Estimates of this replacement cost for a typical central office are frequently in excess of $3 million. The incurring of such costs for the replacement of switching equipment which is functioning well is not justified by initial increases in revenues from the provision of more efficient switching.

The present invention provides a method and apparatus for implementing SS7 capabilities within Class 5 central offices such as the 1/1A ESS (a Trademark of AT&T Technologies, Inc.) and the No. 5 Crossbar. This is accomplished without affecting the underlying operating principles of the existing switching office. In addition, the SS7 capability is provided in a cost effective manner without adversely affecting the quality of service as perceived by the subscribers connected to such a switching office. Further, the SS7 capability is provided in such a manner so as not to adversely affect the operation of the upgraded switching office or the rest of the telephone system.

The SS7 protocol requires that the control signals for the management of the telephone circuits be transmitted from the calling switching office to the receiving switching office on a separate circuit from the trunk circuit on which the telephone message information is transmitted.

The present invention provides a subscriber line interface which is interposed between the calling subscriber and the existing telephone switching system for generating a signal representing the calling number, monitoring the status of the subscriber lines and, when necessary, examining the dialed digits from the calling subscriber. The present invention also includes a receiver module interposed between the existing switching matrix and the existing digit receiver for examining the dialed digits to identify the specific call and the type of trunk circuit required (i.e. SS7, non-SS7 or intra-office). A trunk circuit interface is also coupled to the existing switching system for generating a trunk circuit identification signal which is related to the specific call. A processing unit is coupled to the subscriber line interface, the receiver module, and the trunk circuit interface for receiving the signals representing the calling number, the called number, and the trunk circuit identification, all of which are related to the specific call. These signals are then transmitted on a separate line to the receiving switching office for management of the switching circuits on the receiving end to couple the incoming call to the correct receiving subscriber on the correct trunk circuit.

SUMMARY OF THE INVENTION

The present invention relates to apparatus and a method for providing existing telephone switching equipment, that normally connects a calling subscriber to a remote receiving subscriber through a switching system having a switch matrix and a non-SS7 trunk circuit, with the capability of controlling the connection, management and disconnection of incoming and outgoing telephone circuits on SS7 trunk circuits using the SS7 protocol. The apparatus includes a subscriber line interface coupled between a plurality of calling subscribers and the existing switching system for detecting the status condition of any subscriber, coupling dialed called number digits to the switching system and generating a signal identifying the subscriber port or terminal for the specific call. A receiver module is coupled to the output of the existing switch matrix for receiving the dialed called number digits and identifying port signal and generating a first signal identifying the specific call and the type of trunk circuit required as SS7 or non-SS7 . The receiver module also generates a second signal representing the called number for the specific call. The apparatus further includes means for coupling the first signal from the receiver module to the switching system for routing the calling subscriber to the identified type of trunk circuit. Further, a trunk circuit interface is coupled to predetermined ones of the SS7 trunk circuits and the existing switching system for receiving the first signal generated by the receiver module and generating an identification signal for a selected trunk circuit which is related to said specific call and coupling the calling line to the selected SS7 trunk circuit in accordance with the receiver module first signal for transmission to the receiving transcriber. A processor means is coupled to the subscriber line interface for receiving the signal representing the calling subscriber port for the specific call and generating the calling number for the specific call, to the receiver module for receiving the second signal representing the called number for the specific call, and to the trunk circuit interface for receiving the trunk circuit identification signal for the specific call and transmitting the calling number, the called number, and the trunk circuit identification on the SS7 link to the receiving subscriber switching equipment.

BRIEF DESCRIPTION OF THE DRAWINGS

For a more complete understanding of the present invention and the advantages thereof, reference may be made to the following description taken in conjunction with the accompanying drawings in which.

DETAILED DESCRIPTION OF THE DRAWINGS

Figure 1:
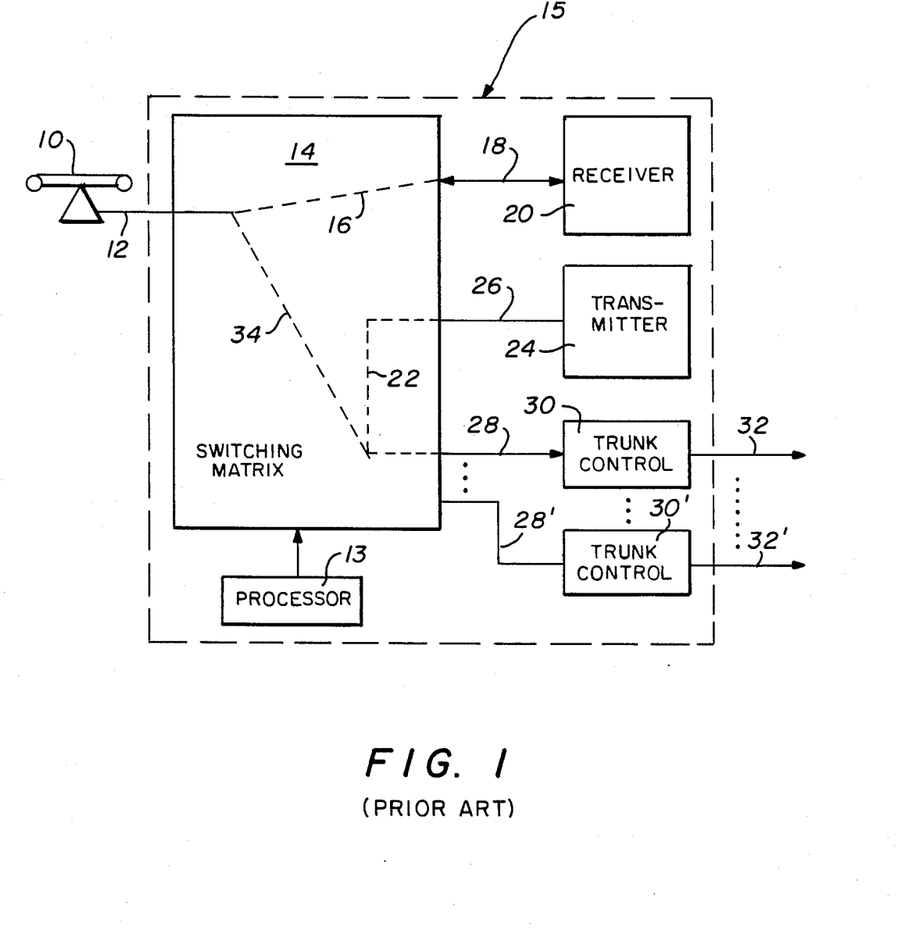
FIG. 1 is a block diagram representing the prior art non-SS7 telephone switching devices having a switching system for coupling a calling subscriber to a trunk circuit or for coupling a received signal on a trunk circuit to a called subscriber.

Standard Class 5 central telephone offices and access tandems in general, such as the 1ESS, 1AESS and the No. 5 Crossbar do not possess Signaling System #7 protocol, or SS7, capability. FIG. 1 discloses such a typical prior art non-SS7 switching system. As can be seen in FIG. 1, the subscriber telephone 10 generates a status signal such as, for instance, on-hook and off-hook signals, as well as dialed number digits, and the conversation message on line 12 to the switching system 15 in general and to switching matrix 14, in particular. The off-hook signal and the called number dialing digits are connected, in a well known manner, through switch 16 in switching matrix 14 on line 18 to a switching system receiver 20 which collects the digits as dialed by the subscriber and provides the line supervision. The stored digits in receiver 20 are analyzed by a processor 13 in the switching system 15 which then determines the outgoing route and trunk circuit. The processor 13 in the switching system 15 then closes switch contacts 22 to couple a transmitter 24 through line 26 to an appropriate one of a plurality of lines 28-28' and trunk control circuits 30-30' to transmit the called number on trunk circuits 32-32' to the remote receiving switching office. After the dialed number is transmitted on the appropriate one of trunk circuits 32-32', the processor 13 opens switch connection 22 thus disconnecting transmitter 24 and coupling switch connection 34 to the input subscriber line 12 so that the subscriber can communicate through telephone terminal 10 to the number dialed.

One of the major disadvantages of this system is that the called number must be determined and a connection made between the transmitter 24 and the trunk circuit 32. The called number is then transmitted on the trunk circuit 32 and, next, the circuit to the transmitter is disconnected and the circuit completed between the telephone subscriber terminal and the output trunk circuit.

The SS7 protocol enables more rapid and efficient switching to occur by the use of a separate control circuit from the transmitting switching office to the receiving switching office. This control circuit is distinct from the information trunk circuit which carries the conversation information between the calling subscriber and the called subscriber. However, it is not economically feasible to replace the prior art switching equipment of FIG. 1 for newer equipment embodying the SS7 protocol. To upgrade the existing switching systems as shown in FIG. 1 to accept the SS7 protocol requires not only that all of the requirements of the SS7 protocol be followed, but also that the existing switching circuit functions not be disturbed. They must be allowed to operate in their usual fashion when needed.

The SS7 protocol requires that a control circuit or SS7 link be established on which the calling station transmits the calling number, the called number, and the identification of the trunk circuit carrying the telephone message. This control circuit is separate from the trunk circuit which carries the subscriber message.

Figure 2:
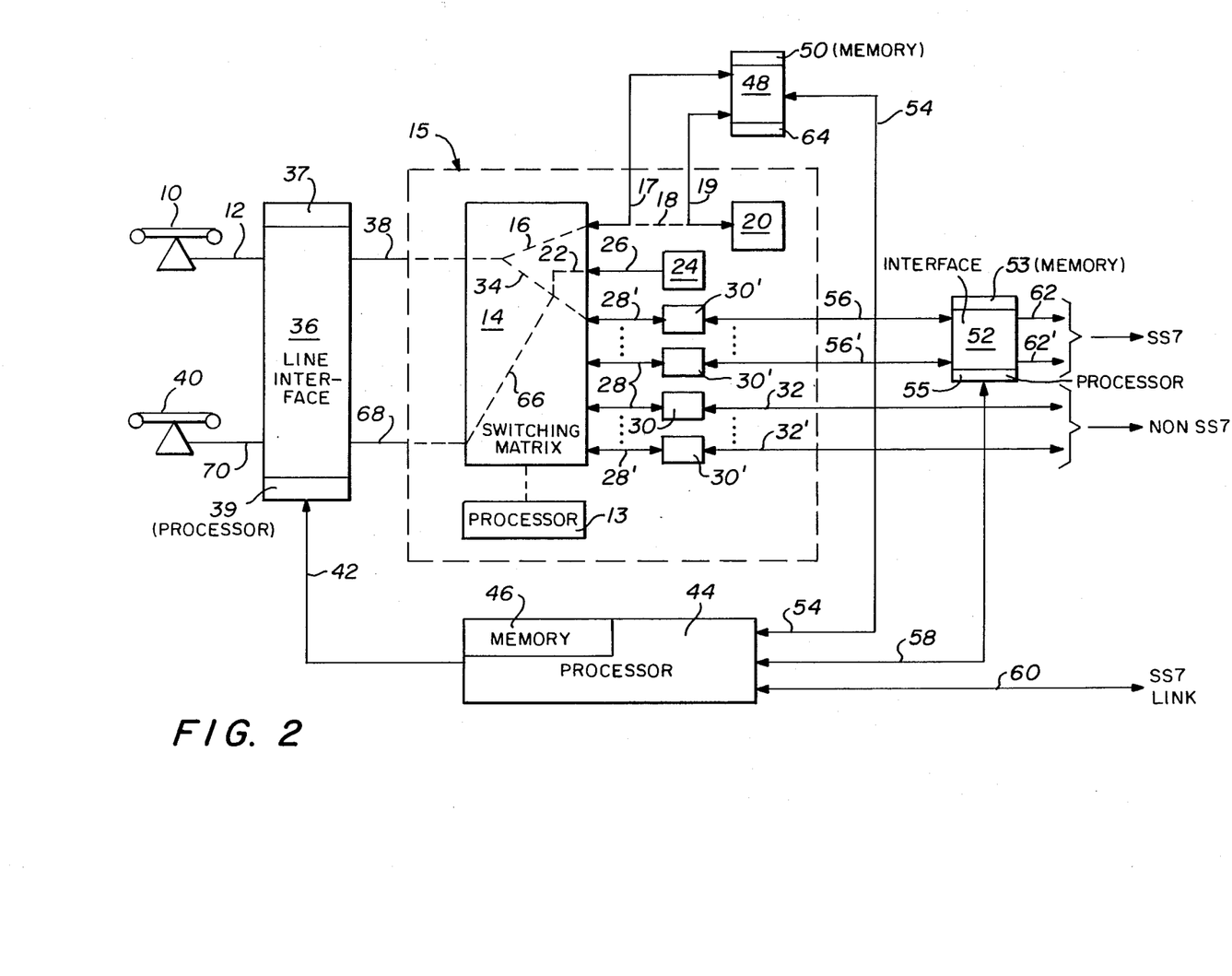
FIG. 2 is a diagrammatic representation of the apparatus of the present invention used in conjunction with the existing switching system of FIG. 1 to upgrade it with the capability of controlling the connection, management and disconnection of incoming and outgoing telephone circuits using the SS7 protocol.

FIG. 2 illustrates the prior art switching system of FIG. 1 designated by the numeral 15 to which has been added equipment necessary to upgrade the system to accommodate the SS7 protocol without disturbing the operation of the prior art system 15. Like numerals used in FIG. 2 designate like elements in FIG. 1. It will be noted that the only change to the prior art switching system 15 in FIG. 2 is that the connection 18 between the switching matrix 14 and customer dial pulse receiver 20 is broken and a receiver module 48 is interposed between those two units using connections 17 and 19.

As can be seen in FIG. 2, an off-hook status occurs on line 12 as a result of the subscriber 10 going off-hook (or equivalent equipment action such as a PABX seizure). This off-hook status is coupled to a subscriber line interface 36 that is interposed between the calling subscriber telephone 10 and the switching matrix 14 in switching system 15. It will be understood, of course, that a plurality of subscribers, as represented by additional telephone 40, may also be coupled to the subscriber line interface 36. Subscriber line interface 36 includes a memory 37 for storing necessary information and a processor 39 for controlling information received and stored. In addition, subscriber line interface 36 contains a ringing signal detector circuit and an on-hook/off-hook detector circuit.

Subscriber line interface 36 generates a signature tone for the call, the identity of which, along with the line number (line 12) and the status change to off-hook, is coupled on line 42 to processor 44 which has memory 46 for storing this data in relation to this specific call. A particular number is identified by processor 44 as the calling number of subscriber 10 and is associated in its memory 46 with the stored signature tone identity, line number and line status as described above.

The switching system 15 performs its normal function of coupling the line 12 via matrix 14 using switching circuit 16 to the switching system receiver 20. The receiver module 48 is interposed between the matrix 14 and the switching system receiver 20 and provides appropriate status and signaling toward both the switching matrix 14 and the switching system receiver 20 so that the switching system 15 is not affected by the interposition of receiver module 48.

The signature tone, generated by subscriber line interface 36, is coupled through the switching system matrix 14 to the receiver module 48. The receiver module 48 returns dial tone to the subscriber 10.

The signature tone identity is then transmitted by receiver module 48 through line 54 to the processor 44 requesting calling line information. The processor 44 responds with the calling line information associated with the signature tone as it has determined from information stored in its memory 46. This information is stored in the receiver module memory 50.

When the subscriber dials the called number digits, they are coupled to the receiver module 4. From these called number digits, the receiver module 48 searches its memory 50 to determine the call destination, such as an SS7 trunk or a non-SS7 trunk or an intra-office call circuit, and calling number information along with any additional information pertinent to the called number such as area code and the like.

If the receiver module 48 determines the call destination is to an SS7 trunk, the receiver module 48 generates a first signal identifying the specific call and the type of trunk circuit required. This first signal is typically a 7 or 10 digit number of the format normally used by the switching system 15 in routing calls to trunk circuits. This first signal is a pseudo code which the receiver module 48 sends to the switching system receiver 20 in switching system 15 in the form of a specific digit string that, when analyzed by switching system processor 13, will cause a specific matrix switch 34 in switching matrix 14 to connect to the desired trunk circuit 56 through trunk control circuit 30'.

The receiver module 48 generates a second signal related to the specific call consisting of the called number and the first signal or pseudo code. This second signal is coupled to processor 44 via line 54 and is stored in memory 46 associated with the specific call.

The switching system 15 using switching matrix 14, switch 22, transmitter 24 and trunk control circuit 30' will send the first signal or pseudo code via a selected switching system trunk circuit 56 to trunk circuit interface 52 using the normal switching system process for a trunk call. Interface 52 also has a memory 53 for storing necessary information and a processor 55 for controlling information received and stored.

The trunk circuit interface 52 couples the selected switching system trunk circuit 56 to the SS7 network trunk circuit 62. The trunk circuit interface 52 then sends the pseudo code received and the identification of the SS7 network trunk circuit 62 to processor 44 via line 58. The processor 44 associates this information via the pseudo code to the specific call information in memory 46.

The processor 44 now has the signals necessary for transmitting the SS7 protocol information on the separate SS7 link 60 to the call receiving switching office.

Thus, while the subscriber station 10 is now coupled through the switching matrix 14 via switch 34, appropriate switching system trunk circuit 56, trunk interface circuit 52 and through network trunk circuit 62 to the receiving switching office, the processor 44 is simultaneously transmitting the calling number, the called number, the trunk circuit identification and other appropriate information required for SS7 protocol on SS7 link 60 to the receiving switching office for connecting and managing the call when it is received at the receiving switching office.

Thus, it will be seen from FIG. 2, that the operation of the existing switching system is not affected by the connection of the equipment necessary to upgrade the switching system to accommodate the SS7 protocol.

The memory 50 in receiver module 48 also stores information relating the called number digits to a destination. A translator or comparator 64 in the receiver module 48 compares the dialed digits with the stored information to generate the routing signal identifying the type of destination required for the dialed digits such as an intra-office call or the type of trunk line (SS7 or non-SS7). Thus, if the signal generated indicates that the dialed digits are to be routed to an intra-office called number, the appropriate switch in switching matrix 14 is actuated. For instance, switch 66 may be actuated to couple switch path 34 to line 68, through subscriber interface 36, and line 70 to telephone subscriber 40.

If, when analyzing the subscriber dialed digits, the receiver module 48 determines that the call destination is a non-SS7 trunk group, it repeats the subscriber dialed digits to the switching system receiver 20. The switching system 15 processes the call as it would normally to a non-SS7 trunk circuit 32 through trunk control circuit 30.

If, when analyzing the subscriber dialed digits, the receiver module 48 determines that the call destination is an intra-office call and no special feature is required for the destination, the receiver module 48 repeats the subscriber dialed digits into the switching system receiver 20 and the switching system 15 processes the call as it normally would to a called subscriber. The subscriber line interface 36, being interposed between the called subscriber and the switching system 15, would detect the status of the subscriber line, for example, when it is being provided a ringing signal from the switching system 15, and when the called subscriber has gone off-hook. The subscriber line interface 36 passes the status information via line 42 to processor 44 which stores the information in memory 46.

If, when analyzing the subscriber dialed digits, the receiver module 48 determines that the call destination is an intra-office call requiring special features such as selective call rejection for the destination based on the calling line information, the receiver module 48, from its data in memory 50 or via access of processor 44 memory information on line 54, can reject the call or forward the call to a different destination via appropriate digits sent to the switching system receiver 20.

At the receiving switching office, the same system shown in FIG. 2 works in reverse. Thus, processor 44 receives on SS7 link 60, a network trunk circuit 62 identification, the calling number, the called number and other appropriate information per SS7 protocol from the remote switching office. If, when analyzing the called number, the processor 44 determines from its memory 46 that the called subscriber has gone off-hook, or is being provided a ringing signal by the switching system 15, then it can reject the call by normal SS7 protocol or forward the call using information from memory 46 to a different destination by modifying the called number appropriately.

If, when analyzing the called number, the processor 44 determines that the call destination is one requiring special features such as selective call rejection for the destination based on the calling line information, the processor 44, using information from memory 46, can reject the call or forward the call to a different destination by modifying the called number appropriately.

If the call has not been rejected, the called or the modified called number and trunk circuit identification received by processor 44 on SS7 link 60 are coupled on line 58 to the trunk circuit interface 52. The trunk circuit interface 52 sends the called number via existing trunk circuit protocol to the appropriate switching system trunk circuit 56. The trunk circuit interface 52 utilizes the trunk circuit identification to couple the SS7 network trunk circuit 62 to the appropriate switching system trunk circuit 56. The switching system 15 processes the call in the normal fashion coupling the switching system trunk circuit 56 to the called subscriber 10. Thus, the subscriber line 10 is now connected through the appropriate port in subscriber line interface 36 to the appropriate switch circuit 34 in switching matrix 14.

In addition, the processor 44 also has data stored in its memory 46 representing special features such as, for example only, distinctive ringing and calling line identification display. Terminals that have the ability to generate and accept such special feature information are identified as CLASS terminals. CLASS is a Service Mark of Bell Communications Research, Inc. In FIG. 2, subscriber telephone 40 may be considered such a terminal. Other terminals that are not capable of generating or receiving such special information are known as non-CLASS terminals. Terminal 10 in FIG. 2 may be considered such a terminal. Thus, if non-CLASS terminal 10 is to communicate with CLASS terminal 40, the processor 44, having received the signature tone representing the calling terminal 10 and having received the called number from receiver module 48, knows that terminal 40 is a CLASS terminal. It can, therefore, generate through the subscriber line interface 36 the calling number of subscriber 10 to terminal 40 for display so that the receiving caller knows the number of the calling subscriber 10. In addition, if the subscriber line interface 36 has programmed into it the capability of generating a specialized ringing tone, the processor 44 recognizes that fact and generates a signal on line 42 to the subscriber line interface 36 that causes processor 39 to select the desired ringing tone to be generated and couple it to the called number subscriber 40. Other special features which the CLASS terminal 40 is capable of receiving may also be stored in memory 46 by the processor 44 and caused to be generated by the processor 39 and memory 37 in the subscriber line interface 36 when processor 44 realizes that terminal 40 is the receiving terminal.

When the CLASS terminal 40 is communicating intra-office with a non-CLASS terminal 10, the processor 44 receives the called number from the receiver module 48 and in checking in its memory bank 46, recognizes that terminal 10, the called number, is a non-CLASS terminal and thus, does not generate any special feature instructions on line 42 to the subscriber line interface 36. Thus, the present circuit allows communications intra-office from a CLASS terminal to a non-CLASS terminal or from a non-CLASS terminal to a CLASS terminal.

In addition, the upgraded circuit shown in FIG. 2 will also the existing switching system to function as it normally functions with non-SS7 trunk lines, but will also allow the system to be operated using the SS7 system protocol as necessary. Thus, the underlying principles of the existing switching office are not affected. In addition, the SS7 capability is provided as disclosed herein in a cost effective manner and without adversely affecting the quality of service as perceived by the subscribers connected to the switching office.

The invention has been described in connection with a preferred embodiment. This description is not intended to limit the scope of the invention to the particular form set forth, but, on the contrary, it is intended to cover such alternatives, modifications, and equivalents as may be included within the spirit and scope of the invention as defined in the appended claims.

I claim:

1. Apparatus for upgrading existing telephone switching equipment, that normally connects a calling subscriber to a receiving subscriber through a switching system having a switching matrix and non-SS7 trunk circuits, with the capability of controlling the connection, management and disconnection of incoming and outgoing telephone calls on SS7 trunk circuits using an SS7 link and the SS7 protocol comprising:

a subscriber line interface coupled between a plurality of calling subscribers and the switching system for detecting a status condition of any subscriber, generating a signal identifying a calling subscriber port for a specific call, and coupling dialed called number digits and the calling subscriber port identifying signal to the switching system;

a receiver module coupled to the switching system for receiving the dialed called number digits and calling subscriber port identifying signal, generating a first signal identifying the specific call and the type of trunk circuit required as SS7 or non-SS7, and generating a second signal representing the called number associated with the specific call, the first signal being coupled to said switching matrix for routing a calling subscriber line to the identified trunk circuit;

a trunk circuit interface coupled to predetermined ones of said SS7 trunk circuits and to said switching system for receiving the first signal generated by the receiver module and generating a trunk circuit identification signal related to the specific call, said trunk circuit interface coupling the calling subscriber line to a SS7 trunk circuit selected in accordance with the first signal of said receiver module; and processor means coupled (1) to said subscriber line interface for receiving the signal representing said calling subscriber port associated with the specific call and generating the calling number for the specific call, (2) to said receiver module for receiving the second signal representing the called number associated with the specific call, and (3) to said trunk circuit interface for receiving the trunk circuit identification signal for the specific call and transmitting the calling number, the called number, and the trunk circuit identification signal on the SS7 link to switching equipment coupled to the receiving subscriber.

2. Apparatus as in claim 1 further comprising:

said processor means including means for receiving the trunk circuit identification signal, the calling number, and the called number on the SS7 link from calling subscriber switching equipment;

means coupling the called number and the trunk circuit identification signal from said processor means to said trunk circuit interface; and said trunk circuit interface including means for utilizing the trunk circuit identification signal to couple the called number and the SS7 trunk circuit to a trunk circuit of the switching equipment for communication with the called subscriber.

3. Apparatus as in claim 1 wherein said receiver module includes:

a memory for storing information relating the dialed called number to an intra-office or trunk circuit destination; and translator means for comparing the dialed called number with the stored information to generate the first signal identifying the type of destination required by the dialed called number.

4. Apparatus as in claim 1 further comprising:

said receiver module including means for identifying the dialed called number as an intra-office call;

said processor means including means for storing special features information for each called number and calling number; and means for coupling the dialed called number for an intra-office call and the special features information related to the called number to said subscriber line interface for connection to the called number subscriber.

5. Apparatus as in claim 2 further comprising:

said processor means including means for storing special features information for each called number and calling number received on the SS7 link; and means for coupling the dialed called number received on said SS7 link and the special features information related to the called number to said subscriber line interface for connection to the called subscriber.

6. Apparatus as in claim 4 wherein said means for identifying the dialed called number as an intra-office call comprises:

a memory for storing information relating the dialed called number to intra-office destinations; and translator means for comparing the called dialed number with the stored information to generate a routing signal when the dialed number is to be routed as an intra-office call.

7. Apparatus as in claim 4 wherein the special features information includes data representing distinctive ringing and calling line identification display.

8. Apparatus as in claim 7 further including means in said subscriber line interface for forwarding the special features information to the called subscriber.

9. Apparatus as in claim 5 wherein said the special features information includes data representing distinctive ringing and calling line identification display.

10. Apparatus as in claim 9 further including means in said subscriber line interface for forwarding the special features information to the called subscriber.

11. A method of providing existing telephone switching equipment, that normally connects a calling subscriber to a receiving subscriber through a switching system having a switching matrix and non-SS7 trunk circuits, with the capability of controlling the connection, management and disconnection of incoming and outgoing telephone calls on SS7 trunk circuits using an SS7 link and the SS7 protocol comprising the steps of:

detecting by a subscriber line interface coupled to a plurality of calling subscribers a status condition of any calling subscriber, generating a signal identifying a calling subscriber port for a specific call, and coupling a dialed called number and the calling subscriber port identifying signal to the switching system;

receiving in a receiver module coupled to the switching system the dialed called number and the calling subscriber identifying port signal and generating a first signal identifying the specific call and the type of trunk circuit required as SS7 or non-SS7 and generating a second signal representing the called number and the specific call;

coupling the first signal from the receiver module to the switching system for routing a calling subscriber line to the identified trunk circuit;

receiving a trunk circuit interface coupled to predetermined ones of the SS7 trunk circuits and to the switching system the first signal generated by the receiver module and generating a trunk circuit identification signal related to the specific call and coupling the calling subscriber line to a SS7 trunk circuit selected in accordance with the first signal of the receiver module; and receiving in a processor means coupled to the subscriber line interface the calling subscriber port signal for the specific call and generating the calling number for the specific call, receiving from the receiver module coupled to the processor means the second signal representing the called number for the specific call, receiving from the trunk circuit interface coupled to the processor means the trunk circuit identification signal for the specific call, and transmitting the calling number, the called number and the trunk circuit indentification signal on the SS7 link to the switching equipment coupled to the receiving subscriber.

12. A method as in claim 11 further comprising the steps of:

receiving in the processor means a trunk circuit identification signal, the calling number and the called number from SS7 link from switching equipment coupled to the calling subscriber;

coupling the called number and trunk circuit identification signal from the processor means to the trunk circuit interface; and in response to the called number and the trunk identification signal, the trunk circuit interface sends the called number to the appropriate switching system trunk circuit and couples the SS7 trunk circuit to the switching system trunk circuit to provide communication with the called subscriber.

13. A method as in claim 11 further including the steps of:

storing information in a memory in said receiver module to relate the dialed called number to an intra-office or trunk circuit destination; and comparing the dialed called number with the stored information in the receiver module to generate the first signal identifying the type of destination required by the dialed called number.

14. A method as in claim 11 further including the steps of:

identifying the dialed called number as an intra-office call;

storing special features information in a memory of the processor means for each called number and calling number; and coupling the dialed called number for an intra-office call and the special features information related to the called number to the subscriber line interface for connection to the called number subscriber.

15. A method as in claim 12 further including the steps of:

storing special features information in the memory of the processor means for each called number and calling number received on the SS7 link; and coupling the dialed called number received on the SS7 link and the special features information related to the called number to the subscriber line interface for connection to the called number.

16. A method as in claim 14 wherein the step of identifying the dialed called number as an intra-office call further comprises the steps of:

storing information in a memory in the receiver module relating the called number to an intra-office destination; and comparing the dialed called number with the stored information to generate an intra-office routing signal when the dialed called number is to be routed to an intra-office number.

17. A method as in claim 14 wherein said stored special features information includes data representing distinctive ringing and calling line identification display.

18. A method as in claim 17 further including the step of forwarding the special features information to said called subscriber.

19. A method as in claim 15 wherein the stored special features information includes data representing distinctive ringing and calling line identification display.

20. A method as in claim 19 further including the step of forwarding the special features information to the called subscriber.

21. Apparatus for controlling the connection, management and disconnection of incoming and outgoing telephone calls on SS7 trunk circuits using an SS7 link and the SS7 protocol comprising:

means for generating a first signal identifying a specific call and the type of trunk circuit required as SS7 or non-SS7, for routing an incoming telephone call to the identified trunk circuit;

interface means coupled to predetermined ones of said SS7 trunk circuits for receiving the first signal from said means for generating and generating a trunk circuit identification signal related to the specific call, said interface means coupling the incoming telephone call to a SS7 trunk circuit selected in accordance with the first signal; and processor means coupled to said means for generating and said interface means for generating a called number for the specific call and for receiving the trunk circuit identification signal for the specific call and transmitting the called number and the trunk circuit identification signal on the SS7 link to switching equipment coupled to the receiving subscriber.

22. Apparatus as in claim 21 wherein:

said processor means includes means for receiving the trunk circuit identification signal, a calling number, and the called number on the SS7 link from the switching equipment coupled to the calling subscriber;

means forwarding the called number and trunk circuit identification signal from said processor means to said interface means; and said interface means includes means for coupling the called number to a switching equipment trunk circuit and utilizing the trunk circuit identification signal to couple the SS7 trunk circuit to the trunk circuit of the switching equipment for communication with the called subscriber.

23. Apparatus as in claim 21 wherein said means for generating includes:

a memory for storing information relating the called number to an intra-office or trunk circuit destination; and means for comparing the called number with the stored information to generated the first signal identifying the type destination required by the called number.

24. Apparatus as in claim 21 further comprising:

said means for generating includes means for identifying the called number as an intra-office call;

said processor means includes means for storing special features information for each called number and calling number; and means responsive to the called number for an intra-office call and the special features information related to the called number for connection to the called number subscriber.

25. Apparatus as in claim 24 wherein said means for identifying the called number as an intra-office call comprises:

a memory for storing information relating the called number to intra-office destinations; and means for comparing the called number with the stored information to generate a routing signal when the called number is to be routed as an intra-office call.

26. A method of controlling the connection, management and disconnection of incoming and outgoing telephone calls on SS7 trunk circuits using an SS7 link and the SS7 protocol comprising the steps of:

receiving a called number and generating a first signal identifying the specific call and the type of trunk circuit required as SS7 or non-SS7 and generating a second signal representing the called number and the specific call;

in response to the first signal, routing a calling subscriber line to the identified trunk circuit and generating a trunk circuit identification signal related to the specific call;

coupling an incoming telephone circuit to a SS7 trunk circuit selected in accordance with the first signal; and in processor means, generating the calling number for the specific call, receiving the second signal representing the called number for the specific call, receiving the trunk circuit indentification signal for the specific call, and transmitting the calling number, the called number and the trunk circuit identification signal on the SS7 link to switching equipment coupled to the receiving subscriber.

27. A method as in claim 26 further comprising the steps of:

receiving in the processor means the trunk circuit identification signal, the calling number and the called number from the SS7 link;

in response to called number and the trunk circuit identification signal, coupling the SS7 trunk circuit to a switching system trunk circuit to provide communication with the called subscriber.

28. A method as in claim 26 further including the steps of:

storing information to relate the called number to an intra-office or trunk line destination; and comparing the called number with the stored information to generate the first signal identifying the type of destination required by the called number.

29. A method as in claim 26 further including the steps of:

identifying the called number as an intra-office call;

storing special features information in a memory of the processor means for each called number and calling number; and forwarding the called number for an intra-office call and the special features information related to the called number to the called number subscriber.

30. A method as in claim 27 further including the steps of:

storing special features information in the memory of the processor means for each called number and calling number received on the SS7 link; and coupling the called number received on the SS7 link and the special features information related to the called number to the called number.

31. A method as in claim 29 wherein the step of identifying the dialed called number as an intra-office call further comprises the steps of:

storing information in a memory relating the called number to an intra-office destination; and comparing the called number with the stored information to generate an intra-office routing signal when the called number is to be routed to an intra-office number.

* * * * *

UNITED STATES PATENT AND TRADEMARK OFFICE
CERTIFICATE OF CORRECTION

PATENT NO. : 4,853,955

DATED : August 1, 1989

INVENTOR(S) : David W. Thorn, Rajendra Patel, Gerald Coley, Ashok Trivedi and Girish Patel It is certified that error appears in the above-identified patent and that said Letters Patent is hereby corrected as shown below:

```
Column  5, line 22, change "4" to --48--.
Column  8, line  4, change "also" to --allow--.
Column  9, line 57, change "said the special" to --the special--.
Column 10, line 20, after "receiving", insert --at--.
Column 10, line 50, after "trunk", insert --circuit--.
Column 11, line 32, change "said" to --the--.
Column 12, line 18, change "generated" to --generate--.
Column 12, line 19, after "type", insert --of--.
```

Signed and Sealed this

Seventeenth Day of July, 1990

Attest:

HARRY F. MANBECK, JR.

Attesting Officer

Commissioner of Patents and Trademarks